United States Patent
Yang

(10) Patent No.: US 12,058,758 B2
(45) Date of Patent: Aug. 6, 2024

(54) METHOD OF CONNECTION REESTABLISHMENT, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 373 days.

(21) Appl. No.: 17/482,396

(22) Filed: Sep. 22, 2021

(65) Prior Publication Data
US 2022/0015177 A1    Jan. 13, 2022

Related U.S. Application Data

(63) Continuation of application No. PCT/CN2019/121846, filed on Nov. 29, 2019.

(51) Int. Cl.
| | |
|---|---|
| *H04W 72/04* | (2023.01) |
| *H04W 24/10* | (2009.01) |
| *H04W 36/00* | (2009.01) |
| *H04W 36/08* | (2009.01) |
| *H04W 76/19* | (2018.01) |

(52) U.S. Cl.
CPC .......... *H04W 76/19* (2018.02); *H04W 36/08* (2013.01)

(58) Field of Classification Search
None
See application file for complete search history.

(56) References Cited

U.S. PATENT DOCUMENTS

| | | | |
|---|---|---|---|
| 2016/0285679 A1* | 9/2016 | Dudda | .................. H04W 24/10 |
| 2018/0192347 A1* | 7/2018 | Shaheen | ........... H04W 36/0077 |
| 2021/0051542 A1* | 2/2021 | Jokela | .................. H04W 36/08 |
| 2022/0007246 A1* | 1/2022 | de Silva | .......... H04W 36/00837 |

(Continued)

FOREIGN PATENT DOCUMENTS

| | | |
|---|---|---|
| CA | 3095896 | 10/2019 |
| CN | 102104982 | 6/2011 |
| CN | 110351896 | 10/2019 |

(Continued)

OTHER PUBLICATIONS

"5G NR RRC Procedures—RRC connection re-establishment," retrieved from the internet on Sep. 8, 2021: <https://itectec.com/spec/5g-nr-rrc-procedures-rc-connection-re-establishment/>, 3 pages.

(Continued)

*Primary Examiner* — Sai Aung
(74) *Attorney, Agent, or Firm* — Hodgson Russ LLP

(57) ABSTRACT

A method of connection reestablishment, a terminal device, and a non-transitory computer-readable storage medium is provided. The method includes: in a connection reestablishment procedure, determining, by a terminal device, whether to perform the connection reestablishment procedure according to whether the terminal device is configured with a conditional handover (CHO)-based candidate cell.

19 Claims, 5 Drawing Sheets

(56) References Cited

U.S. PATENT DOCUMENTS

2022/0322173 A1* 10/2022 Chang .................. H04W 76/27
2022/0338087 A1* 10/2022 Uchino ................. H04W 36/26

FOREIGN PATENT DOCUMENTS

WO      2019154480      8/2019
WO      2019175463      9/2019

OTHER PUBLICATIONS

"3rd Generation Partnership Project; Technical Specification Group Radio Access Network; NR; Radio Resource Control (RRC) protocol specification (Release 15)," 3GPP TS 38.331, Jun. 2019, v15.6.0, 517 pages.
Qualcomm Incorporated, "LTE Conditional HO design considerations," 3GPP TSG-RAN WG2 Meeting #106, R2-1906375 (Revision of R2-1904662), May 2019, 8 pages.
ZTE Corporation et al., "Discussion on fast HO failure recovery," 3GPP TSG RAN WG2 Meeting #106, R2-1907094, May 2019, 4 pages.
WIPO, International Search Report for PCT/CN2019/121846, Aug. 19, 2020.
EPO, Communication for EP Application No. 19954182.2, Nov. 7, 2022.
ZTE Corporation et al., "Discussion on fast RLF recovery when applying CHO and fast MCG recovery," 3GPP TSG RAN WG2 Meeting #108, R2-1914814 (revision of R2-1913494), Nov. 2019.
CNIPA, First Office Action for CN Application No. 202111409046.5, Jan. 6, 2023.
IPI, Office Action for IN Application No. 202117047668, Jul. 6, 2022.
Nokia, 3GPP TSG-RAN WG2, Meeting #107bis, R2-1913153, "Failure Handling in the Presence of Prepared CHO Candidates", Oct. 2019.
Intel Corporation, 3GPP TSG-RAN WGZ, #107, R2-1911640, "Offline Discussion Report on 800", Aug. 2019.
Vivo, 3GPP TSG-RAN WG2, Meeting #107, R2-1909536, "Report on [106#41][NR and LTE CHO]—CHO Execution Details", Aug. 2019.
Samsung, 3GPP TSG-RAN WG2, Meeting #107bis, R2-1913908, "Discussion on Performing CHO Instead of RRE in CHO", Sep. 2019.
Nokia, 3GPP TSG-RAN WGZ, Meeting #108, R2-1915499, "Failure Handling via CHO Recovery", Nov. 2019.
EPO, Extended European Search Report issued in European Application No. 19954182.2, Feb. 22, 2022.
IPO, Office Action for IN Application No. 202117047668, Dec. 14, 2023.
JPO, Office Action for JP Application No. 2021-577514, Dec. 15, 2023.

* cited by examiner

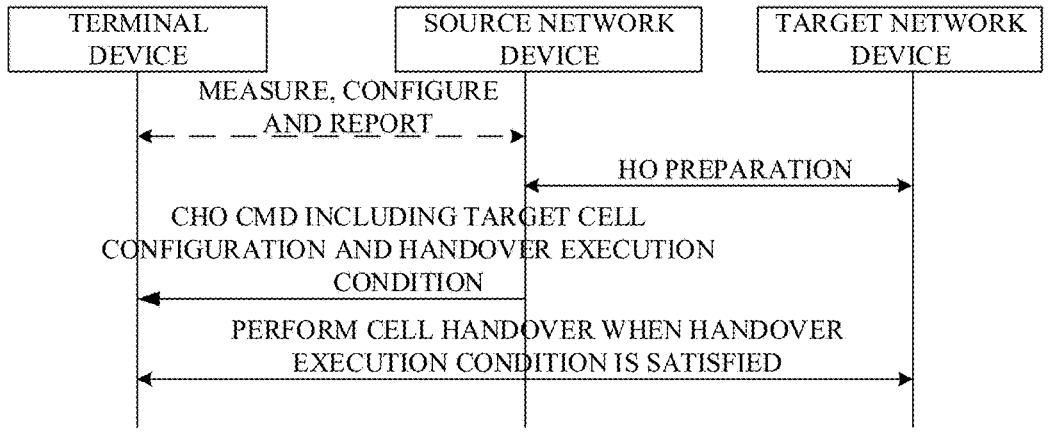
FIG. 2
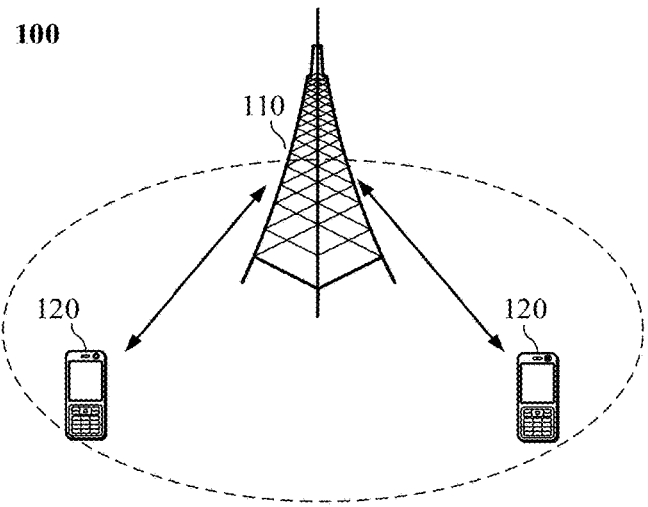
FIG. 3
A TERMINAL DEVICE, IN CONNECTION REESTABLISHMENT, PROHIBITS EXECUTION OF AT LEAST ONE OF: SUSPENDING ALL RBS EXCEPT AN SRB0; RESETTING MAC; RELEASING CONFIGURATION OF ALL SCELLS IN AN MCG; OR RELEASING SPCELLCONFIG — S201
FIG. 4

A TERMINAL DEVICE RESUMES AN SRB1 WHEN A CELL SELECTED BY THE TERMINAL DEVICE FOR CONNECTION REESTABLISHMENT IS A CHO-BASED CANDIDATE CELL — S301

METHOD OF CONNECTION REESTABLISHMENT, TERMINAL DEVICE, AND NON-TRANSITORY COMPUTER-READABLE STORAGE MEDIUM

CROSS-REFERENCE TO RELATED APPLICATION(S)

This application is a continuation of International Application No. PCT/CN2019/121846, filed on Nov. 29, 2019, the entire disclosure of which is hereby incorporated by reference.

TECHNICAL FIELD

This disclosure relates to the technical field of wireless communications, and more particularly to a method of connection reestablishment, a terminal device, and a non-transitory computer-readable storage medium.

BACKGROUND

In the related art, in a connection reestablishment procedure, if a cell to be accessed is a conditional handover (CHO)-based cell, how a terminal device (i.e., user equipment, UE) will perform the connection reestablishment procedure has not been clarified.

SUMMARY

Implementations provide a method of connection reestablishment, a terminal device, and a non-transitory computer-readable storage medium.

In a first aspect, implementations provide a method of connection reestablishment. The method includes: in a connection reestablishment procedure, determining, by a terminal device, whether to perform the connection reestablishment procedure according to whether the terminal device is configured with a CHO-based candidate cell.

In a second aspect, implementations provide a terminal device. The terminal device includes at least one processor and a memory storing a computer program which, when executed by the at least one processor, causes the at least one processor to: in a connection reestablishment procedure, determine whether to perform the connection reestablishment procedure according to whether the terminal device is configured with a CHO-based candidate cell.

In a third aspect, implementations provide a non-transitory computer-readable storage medium configured to store a computer program. The computer program, when executed by the at least one processor, causes the at least one processor to: in a connection reestablishment procedure, determine whether to perform the connection reestablishment procedure according to whether the terminal device is configured with a CHO-based candidate cell.

BRIEF DESCRIPTION OF THE DRAWINGS

FIG. 2 is a schematic flow chart illustrating CHO-based handover according to implementations.

FIG. 3 is a schematic structural diagram illustrating a communication system according to implementations.

FIG. 4 is a schematic flow chart illustrating a method of connection reestablishment according to implementations.

DETAILED DESCRIPTION

Figure 1:
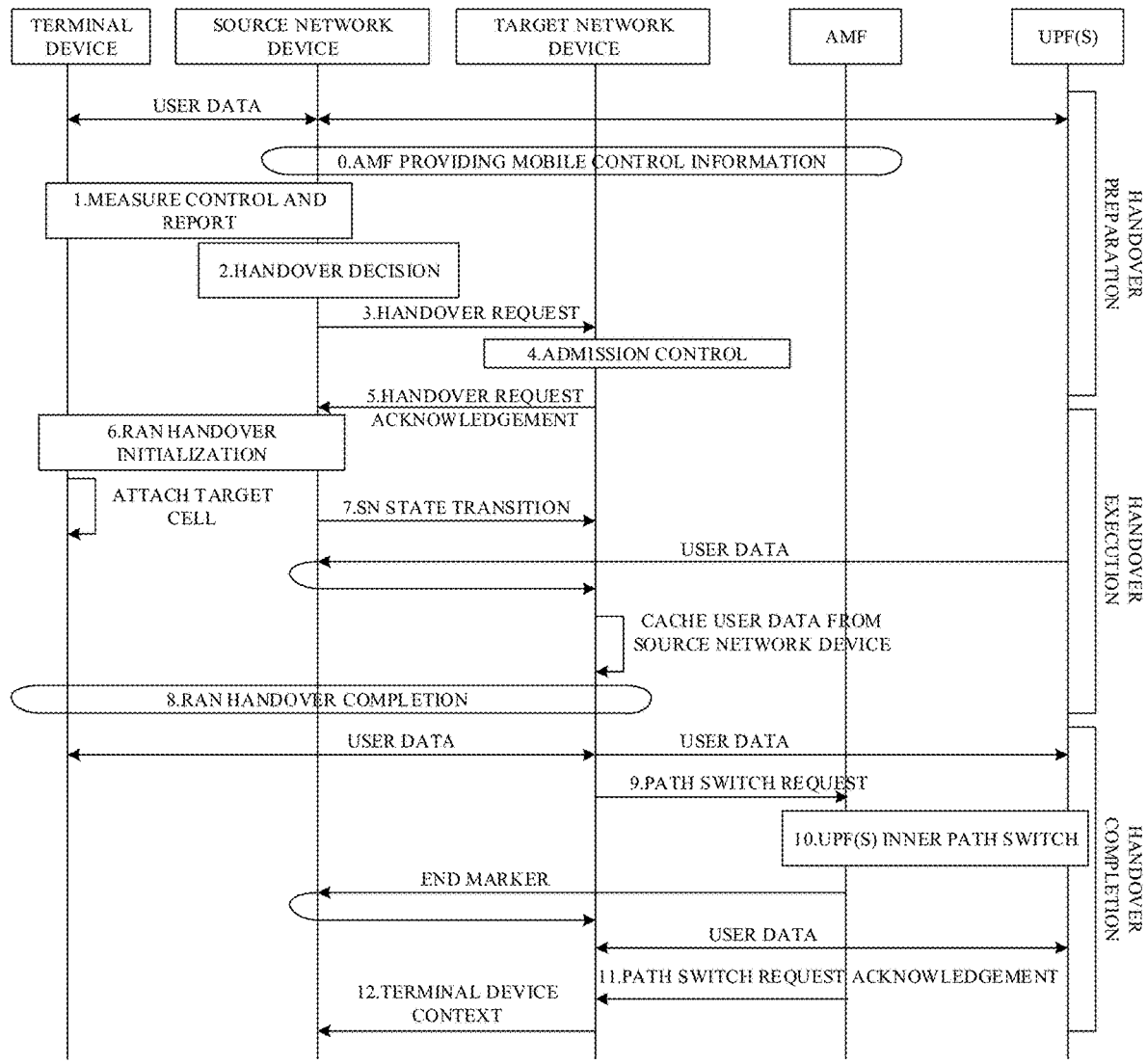
FIG. 1 is a schematic flow chart illustrating cell handover according to implementations.

In order for more comprehensive understanding of features and technical solutions of implementations, the following will describe in detail implementations with reference to the accompanying drawings. The accompanying drawings are merely intended for illustration rather than limitation on the disclosure.

Before describing a method of connection reestablishment in implementations in detail, a cell handover procedure in the related art will be described briefly.

Currently, with the pursuit of speed, delay, high-speed mobility, energy efficiency, and the diversity and complexity of services in the future life, 3rd generation partnership project (3GPP) international standards organization starts to research and develop the 5th generation (5-Generation, 5G). Primary application scenarios of the 5G include enhance mobile broadband (eMBB), ultra reliable low latency communications (URLLC), and massive machine type communication (mMTC).

The demand for eMBB is growing rapidly with the goal of providing users with multimedia content, services and data. On the other hand, since eMBB may be deployed in different scenarios, such as indoor, urban, rural, and the like, the capabilities and demands vary greatly, therefore, it cannot be unconditionally determined and must be analyzed in detail in the context of specific deployment scenarios. Typical applications of URLLC include: industrial automation, power automation, remote medical operation (surgery), traffic safety and security, and the like. Typical features of mMTC include: high connection density, small data volume, delay-insensitive services, low cost and long lifetime of the module, and the like.

New radio (NR) systems can also be deployed independently, and a new radio resource control (RRC) state, i.e., an RRC-Inactive state, is defined in order to reduce radio signaling, quickly resume wireless connection, and quickly resume data services. In an RRC-Idle state, mobility is based on cell re-selection performed by a terminal device, a paging procedure is initiated by a core network (CN), and a paging area is configured by the CN. There is no terminal device context and no RRC connection at a network device side. In the RRC-Inactive state, mobility is based on the cell re-selection performed by the terminal device, there is a connection between CN-NR, the terminal device context exists in a network device, the paging procedure is triggered by a radio access network (RAN), an RAN-based paging area is managed by the RAN, and the network device able to know a location of the terminal device is based on a paging area level of the RAN. In an RRC-Connected state, there is an RRC connection, the terminal device context exists between the network device and the terminal device, the network device knows the location of the terminal device according to a cell level. Mobility is controlled by the network device, and unicast data can be transmitted between the network device and the terminal device.

When the terminal device in the RRC-Connected state has link handover failure, wireless link failure, integrity protection failure, RRC reconfiguration failure, or the like, if the terminal device has established a signalling radio bearer 2 (SRB2) and a data resource bearer (DRB), the terminal device can trigger RRC connection reestablishment.

When performing the RRC connection reestablishment, the terminal device needs to perform cell selection, that is, to select a cell to be accessed. The terminal device starts a timer T311. If the timer T311 times out or the terminal device reselects an inter-RAT cell, the terminal device returns to the RRC-Idle state.

An RRC connection reestablishment request message is illustrated as follows. The terminal device transmits the RRC connection reestablishment request message on an SRB0 via an uplink common control channel (UL_CCCH). The RRC connection reestablishment request message may carry initial identification information of an access stratum (AS) layer of the terminal device, Short MAC-I and a reason for reestablishment. The RRC connection reestablishment request message corresponds to message 3 (Msg3) in a random access procedure. After transmitting the RRC connection reestablishment request message, the terminal device activates security, generates a secret key, and resumes an SRB1 to wait for receiving message 4 (Msg4).

The RRC connection reestablishment is illustrated as follows. The network device replies with the RRC connection reestablishment request message on the SRB1 via a downlink dedicated control channel (DL_DCCH), where the replied message by the network device does not carry any actual information (except network colour code (NCC)), the replied message by the network device corresponds to Msg4 in the random access procedure, and Msg4 is used for integrity protection.

An RRC connection reestablishment complete message is illustrated as follows. The terminal device transmits the RRC connection reestablishment complete message on the SRB1 via an uplink dedicated control channel (UL-DCCH), where the RRC connection reestablishment complete message does not carry any actual information and functions as an RRC-layer acknowledgement, the RRC connection reestablishment complete message corresponds to message 5 (Msg5) in the random access procedure, and Msg5 is used for encryption and integrity protection.

During the RRC connection reestablishment, there may be RRC connection reestablishment failure, timeout of the timer T301 started in the RRC connection reestablishment, inappropriate cell selection, or failure of integrity protection verification performed with the RRC connection reestablishment request message (Msg4), or the like. When the above causes failure of the RRC connection reestablishment, the terminal device returns to the RRC Idle state.

If there is no terminal device context in the network device, the network device replies with an RRC connection establishment message on the SRB0 via the DL_CCCH. After receiving the message transmitted by the network device, the terminal device deletes the previous context and performs the RRC connection establishment.

The following will further briefly describe the cell handover procedure.

Similar to a long term evolution (LTE) system, the NR system supports a handover procedure for a terminal device in a connected state. When the terminal device that is using a network service moves from one cell to another cell, due to some reasons such as wireless transmission service load adjustment, activation operation maintenance, equipment failure, or the like, in order to ensure the continuity of communication and the quality of service, the NR system has to transfer a communication link between the terminal device and a source cell to a new cell, i.e., the handover procedure is performed.

Take an Xn-interface handover procedure which is applicable to a cell handover procedure in the LTE system and the NR system as an example, as illustrated in FIG. 1, the Xn-interface handover procedure is divided into the following three stages.

Stage 1 (including steps 1 to 5), handover preparation: including measure control and report, handover request and acknowledgement.

Stage 2 (including steps 6 to 8), handover execution: the terminal device executes the handover procedure immediately in response to reception of a handover command, that is, the terminal device disconnects from the source cell and connects with a target cell (such as performing random access, transmitting an RRC handover complete message to a target network device, etc.), and performs secondary node (SN) state transition and data forwarding.

Stage 3 (including steps 9 to 12), handover completion: the target cell, access and mobility management function (AMF) and user plane function (UPF) execute a path switch, and the terminal device context in a source network device is released.

The terminal device starts a timer T304 immediately in response to reception of the handover command, synchronizes downlink data to the target cell, obtains master information block (MIB) information of the target cell, and then initiates the random access procedure. In the random access procedure multiple re-transmissions of a preamble is allowed until the random access is successful. If the timer T304 times out, the cell handover fails and the terminal device triggers the RRC connection reestablishment.

The following will briefly describe CHO.

For the problems of frequent handover and easy failure of handover in high-speed mobile scenarios and high-frequency deployment scenarios, 3GPP is currently discussing the introduction of the CHO for the LTE and NR systems. As illustrated in FIG. 2, a handover procedure of the CHO is as follows. The terminal device performs cell measure, configuring and reporting according to configuration information and measure configuration of the target cell transmitted by the source network device. The source network device and the target network device perform handover preparation. When the terminal device determines that a handover execution condition of the CHO for the target cell is satisfied, according to a pre-configured CHO command, the terminal device performs handover to the target cell (such as, triggering a random access procedure and transmitting a handover complete message), thus establishing a connection with the target network device. In the CHO procedure, by configuring the CHO command for the terminal device in advance, a problem that it is too late or unable to send the measure report and receive the handover command due to the high-speed movement of the terminal device into a poor coverage area can be avoided. The CHO command includes configuration information of the target cell and handover execution condition configuration of the CHO. The handover execution condition configuration of the CHO is determined by the source network device, and the source network device transmits the determined handover execution condition configuration of the CHO to the terminal device via an RRC message.

The 3GPP RAN2 #106 meeting on a procedure of failure recovery has conclusions as follows.

1. When wireless link fails, the terminal device performs cell selection. If the cell selected is a CHO-based candidate cell, the terminal device tries to perform CHO-based cell handover, otherwise, the terminal device performs a connection reestablishment procedure.

2. If a conventional handover failures (for example, T304 times out) or CHO-based candidate cell access failures (for example, T304-like times out), the terminal device performs the CHO-based cell handover, otherwise, the terminal device performs the connection reestablishment procedure.

The RRC connection reestablishment procedure may include the following four actions: 1. connection reestablishment initialization; 2. transmitting the RRC connection reestablishment request message (Msg3); 3. receiving the RRC connection reestablishment message (Msg4); 4. transmitting the RRC connection reestablishment complete message (Msg5).

The connection reestablishment initialization may include at least one of: stopping the timer T310 and/or T304 that are running, starting a timer T311, suspending all radio bearers (RBs) except an SRB0, resetting media access control (MAC), releasing configuration of all secondary cells (SCells) in a master cell group (MCG), and releasing special cell configuration (spCellConfig), and the like. After performing the connection reestablishment initialization, the terminal device performs the cell selection to select a cell to be accessed. The connection reestablishment initialization may be described as follow:

Upon initiation of the procedure, the UE shall:
1> stop timer T310, if running;
1> stop timer T304, if running;
1> start timer T311;
1> suspend all RBs, except SRB0;
1> reset MAC;
1> release the MCG SCell(s), if configured;
1> release spCellConfig, if configured;
1> if MR-DC is configured:
2> perform MR-DC release, as specified in clause 5.3.5.10;
2> release p-NR-FR1, if configured;
2> release p-UE-FR1, if configured;
1> release delayBudgetReportingConfig, if configured, and stop timer T342, if running;
1> release overheatingAssistanceConfig, if configured, and stop timer T345, if running;
1> perform cell selection in accordance with the cell selection process as specified in TS 38.304 [20], clause 5.2.6.

When the to-be-accessed cell selected by the terminal device is a CHO-based candidate cell, the existing connection reestablishment initialization procedure will result in the candidate cell selected by the terminal device not being accessible. For example, during the CHO-based cell access procedure, when the cell access is completed, the terminal device needs to use the SRB1 to transmit the RRC reconfiguration complete message. However, in the existing connection reestablishment initialization procedure, the terminal device has suspended all the RBs except the SRB0, that is, the SRB1 is also suspended, and thus the terminal device cannot use the SRB1 to transmit the RRC reconfiguration complete message. Further example, in the existing connection reestablishment initialization procedure, after the terminal device releases the SCells in the MCG and the spCellConfig, if configuration of the CHO-based candidate cell used for cell access previously retained by the terminal device is delta configuration based on the SCells in the MCG or the spCellConfig, in case of releasing the configuration of the SCell in the MCG and the spCellConfig, the terminal device cannot be informed of full configuration of the CHO-based candidate cell used for cell access, and the terminal device cannot perform the CHO-based cell access.

A method of connection reestablishment is provided according to an implementation. The method of connection reestablishment in the implementation is applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced LTE (LTE-A) system, an NR system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations herein can also be applied to these communication systems.

System architectures and service scenarios described in implementations are intended to illustrate the technical solutions of the implementations more clearly and do not constitute a limitation to the technical solutions of the implementations. It is understood by those of ordinary skill in the art that the technical solutions of the implementations is equally applicable to similar technical problems as the network architectures evolve and new service scenarios emerge.

The network device related in implementations may be an ordinary base station (such as a Node B (NB), an evolutional Node B (eNB) or a next generation Node B (gNB)), a new radio controller (NR controller), a centralized unit, a new wireless base station, a radio remote module, a micro base station, a relay, a distributed unit, a transmission reception point (TRP), a transmission point (TP) or other devices. There is no limitation on the specific technology and the specific device form adopted by the network device in implementations of the disclosure. For convenience of description, the above devices providing wireless communication functions for terminal devices are collectively referred to as network devices in implementations.

According to implementations, the terminal device may be any terminals, for example, the terminal device may be a user equipment (UE) for machine-type communication. That is, the terminal device is also referred to as a UE, a mobile station (MS), a mobile terminal, or a terminal. The terminal device can perform communication with one or more core network via an RAN, for example, the terminal device may be a mobile phone (or referred to as "cellular" radio telephone), a computer equipped with a mobile terminal, and the like. For example, the terminal device may also be a portable, pocket-sized, handheld, computer-built, or vehicle-mounted mobile device that exchanges language and/or data with the wireless access network. The disclosure is not limited in this regard.

Network devices and terminal devices may be deployed on land, including indoor or outdoor, handheld or vehicle-mounted; on water; and also in the air, on aircraft, balloons and artificial satellites. There is no limitation on the application scenarios of network devices and terminal devices in implementations.

Communication between the network device and the terminal device and between the terminal devices can be done via a licensed spectrum, via an unlicensed spectrum, or via both a licensed spectrum and an unlicensed spectrum. Communication between the network device and the terminal device and between the terminal devices can be done via a spectrum below 7 gigahertz (GHz), via a spectrum above 7 GHz, or via both the spectrum below 7 GHz and the spectrum above 7 GHz. There is no limitation on the spectrum resources used between the network device and the terminal device in implementations.

Generally speaking, a conventional communication system generally supports a limited number of connections and therefore is easy to implement. However, with development of communication technology, a mobile communication system not only supports conventional communication but also supports, for example, D2D communication, M2M communication, MTC, and V2V communication. Implementations herein can also be applied to these communication systems.

As illustrated in FIG. 3, a communication system 100 in implementations may include a network device 110. The network device 110 may be a device that can communicate with a terminal device 120 (also referred to as a "communication terminal" or a "terminal"). The network device 110 can provide a communication coverage for a specific geographical area and communicate with terminal devices in the coverage area. The network device 110 may be a base transceiver station (BTS) in the GSM or CDMA system, or may be an NB in the WCDMA system, or may be an eNB or eNodeB in the LTE system, or a radio controller in a cloud radio access network (CRAN). Alternatively, the network device may be a mobile switching center, a relay station, an access point (AP), an in-vehicle device, a wearable device, a hub, a switch, a bridge, a router, a network side device in a 5G network, or a network device in a future evolved public land mobile network (PLMN), or the like.

The communication system 100 also includes at least one terminal device 120 which is located in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or a cellular telephone, a personal communication system (PCS) terminal integrated with functions of cellular radio telephone, data processing, fax, and/or data communication, a personal digital assistant (PDA) equipped with a radio telephone, a pager, Internet/Intranet access, a web browsing, a notebook, a calendar, and/or a global positioning system (GPS) receiver, and/or a conventional laptop, a handheld receiver, or other electronic devices equipped with a radio telephone receiver. The terminal device may refer to an access terminal, a UE, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

D2D communication may be performed between the terminal devices 120.

The 5G system or the 5G network may be also referred to as an NR system or an NR network.

FIG. 3 illustrates one network device and two terminal devices. The communication system 100 may include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

According to implementations, a device with communication functions in a network/system can be referred to as a "communication device". Taking the communication system 100 illustrated in FIG. 3 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

According to an implementation of the present disclosure, a method of connection reestablishment is provided. The method includes: in a connection reestablishment procedure, determining, by a terminal device, whether to perform the connection reestablishment procedure according to whether the terminal device is configured with a CHO-based candidate cell.

In an implementation, determining, by the terminal device, whether to perform the connection reestablishment procedure according to whether the terminal device is configured with the CHO-based candidate cell includes: performing, by the terminal device, the connection reestablishment procedure, in response to the terminal device being not configured with the CHO-based candidate cell.

In an implementation, determining, by the terminal device, whether to perform the connection reestablishment procedure according to whether the terminal device is configured with the CHO-based candidate cell includes: prohibiting, by the terminal device, execution of a connection reestablishment initialization procedure, in response to the terminal device being configured with the CHO-based candidate cell.

In an implementation, prohibiting, by the terminal device, execution of the connection reestablishment initialization procedure includes: prohibiting, by the terminal device, execution of at least one of: suspending all RBs except an SRB0; resetting MAC; releasing configuration of all SCells in a MCG; or releasing spCellConfig.

In an implementation, the method further includes: determining, by the terminal device, whether to perform the connection reestablishment initialization procedure according to whether a to-be-accessed cell selected by the terminal device is the CHO-based candidate cell.

In an implementation, determining, by the terminal device, whether to perform the connection reestablishment initialization procedure according to whether the to-be-accessed cell selected by the terminal device is the CHO-based candidate cell includes: performing, by the terminal device, CHO-based cell access according to CHO configuration of the candidate cell, in response to the to-be-accessed cell selected by the terminal device being the CHO-based candidate cell.

In an implementation, the method further includes: transmitting, by the terminal device, an RRC reconfiguration complete message to a network device corresponding to the to-be-accessed cell selected by the terminal device.

In an implementation, determining, by the terminal device, whether to perform the connection reestablishment initialization procedure according to whether the to-be-accessed cell selected by the terminal device is the CHO-based candidate cell includes: performing, by the terminal device, the connection reestablishment initialization procedure, in response to the to-be-accessed cell selected by the terminal device being not the CHO-based candidate cell.

In an implementation, performing, by the terminal device, the connection reestablishment initialization procedure includes: performing, by the terminal device, at least one of: suspending, by terminal device, all the RBs except the SRB0; resetting, by terminal device, the MAC; releasing, by terminal device, the configuration of all the SCells in the MCG; or releasing, by terminal device, the spCellConfig.

In an implementation of the present disclosure, a terminal device is provided. The terminal device includes at least one processor and a memory storing a computer program which, when executed by the at least one processor, causes the at least one processor to: in a connection reestablishment procedure, determine whether to perform the connection reestablishment procedure according to whether the terminal device is configured with a CHO-based candidate cell.

In an implementation of the present disclosure, a non-transitory computer-readable storage medium is provided. The storage medium is configured to store a computer program. The computer program, when executed by the at least one processor, causes the at least one processor to: in a connection reestablishment procedure, determine whether to perform the connection reestablishment procedure according to whether the terminal device is configured with a CHO-based candidate cell.

FIG. 4 is a flow chart illustrating a method of connection reestablishment according to implementations. As illustrated in FIG. 4, the method includes the following.

At block S201, a terminal device, in a connection reestablishment procedure, prohibits execution of at least one of: suspending all RBs except an SRB0; resetting MAC; releasing configuration of all SCells in an MCG; and releasing spCellConfig.

In some implementations, the prohibiting may be ignoring, skipping, or canceling. A condition for the terminal device to prohibit the execution of at least one of suspending all the RBs except the SRB0, resetting the MAC, releasing the configuration of all the SCells in the MCG, and releasing the spCellConfig may be that the terminal device is configured with a CHO-based candidate cell.

In some implementations, a condition of triggering the terminal device to perform the connection reestablishment procedure may be a CHO-based candidate cell access failure, a radio link failure, or a conventional cell handover failure, etc., where the conventional cell handover refers to non-CHO-based cell handover.

According to implementations, the method of connection reestablishment further includes an operation at block S202.

At block S202, the terminal device selects a cell to be accessed.

In some implementations, when the cell selected by the terminal device is the CHO-based candidate cell, the method of connection reestablishment in implementations further includes an operation at block S203.

At block S203, the terminal device performs CHO-based cell access according to CHO configuration of the candidate cell.

When the terminal device completes the CHO-based cell access, the method of connection reestablishment in implementations further includes an operation at block S204.

At block S204, the terminal device transmits an RRC reconfiguration complete message to a network device corresponding to the cell selected.

The CHO configuration of the candidate cell is stored in the terminal device. The CHO configuration of the candidate cell may include full configuration of CHO for the candidate cell. The CHO configuration of the candidate cell may also include delta configuration of the CHO for the candidate cell. In case that the CHO configuration of the candidate cell includes the full configuration of the CHO for the candidate cell, the terminal device can perform the cell access directly according to the full configuration of the CHO for the candidate cell. In case that the CHO configuration of the candidate cell includes the delta configuration of the CHO for the candidate cell, since at block S201 the terminal device prohibits the release of the configuration of all the SCells in the MCG and the release of the spCellConfig, the terminal device can obtain the full configuration of the CHO for the candidate cell based on the configuration of all the SCells in the MCG and/or the release of the spCellConfig, and perform the cell access based on the full configuration of the CHO for the candidate cell. Since at block S201 the terminal device prohibits suspending all the RBs except the SRB0, that is, the SRB1 is not suspended, the terminal device can transmit, on the SRB1, the RRC reconfiguration complete message to the network device corresponding to the cell selected. In this way, the terminal device can still perform the connection reestablishment procedure in case that the cell to be accessed is a CHO-based cell.

In other implementations, if the cell selected by the terminal device is not the CHO-based candidate cell, before transmitting an RRC connection reestablishment request message to the network device corresponding to the cell selected, the terminal device can perform at least one of: suspending all the RBs except the SRB0, resetting the MAC, releasing the configuration of all the SCells in the MCG, or releasing the spCellConfig. There is no order of execution among suspending all the RBs except the SRB0, resetting the MAC, releasing the configuration of all the SCells in the MCG, and releasing the spCellConfig.

Based on the method of connection reestablishment in implementations, the related part of the TS 38.331 standard protocol can be described as:

---

5.3.7.2 Initiation
<omitted unchanged text>
Upon initiation of the procedure, the UE shall:
1>stop timer T310, if running;
1>stop timer T304, if running;
1>start timer T311;
1> if UE is not configured with cho-RRCReconfig:
   2> suspend all RBs, except SRB0;
   2> reset MAC;
   2> release the MCG SCell(s), if configured;
   2> release spCellConfig, if configured;
1>if MR-DC is configured:
   2> perform MR-DC release, as specified in clause 5.3.5.10;
   2> release p-NR-FR1, if configured;
   2> release p-UE-FR1, if configured;
1>release delayBudgetReportingConfig, if configured, and stop timer T342, if running;
1>release overheatingAssistanceConfig, if configured, and stop timer T345, if running;
1>perform cell selection in accordance with the cell selection process as specified in TS 38.304 [20], clause 5.2.6.
5.3.7.3 Actions following cell selection while T311 is running
Upon selecting a suitable NR cell, the UE shall:
1>ensure having valid and up to date essential system information as specified in clause 5.2.2.2;
1>stop timer T311;
1>if the selected cell is one of the target candidate cells in VarCHO-Config:
   2> apply the stored cho-RRCReconfig associated to the selected cell and perform the actions as specified in 5.3.5.3;
1>else:
   2> suspend all RBs, except SRB0;
   2> reset MAC;
   2> release the MCG SCell(s), if configured;
   2> release spCellConfig, if configured;
   2> start timer T301;
   2> if T390 is running:
      3> stop timer T390 for all access categories;
      3> perform the actions as specified in 5.3.14.4;
   2> remove all the entries within VarCHO-Config, if any
   2> apply the default L1 parameter values as specified in corresponding physical layer specifications except for the parameters for which values are provided in SIB1;
   2> apply the default MAC Cell Group configuration as specified in 9.2.2;
   2> apply the CCCH configuration as specified in 9.1.1.2;
   2> apply the time Alignment Timer Common included in SIB1;
   2> initiate transmission of the RRCReestablishmentRequestmessage in accordance with 5.3.7.4;
NOTE: This procedure applies also if the UE returns to the source PCell.
Upon selecting an inter-RAT cell, the UE shall:
1>perform the actions upon going to RRC IDLE as specified in 5.3.11, with release cause 'RRC connection failure'.

---

Figures 5, 6:
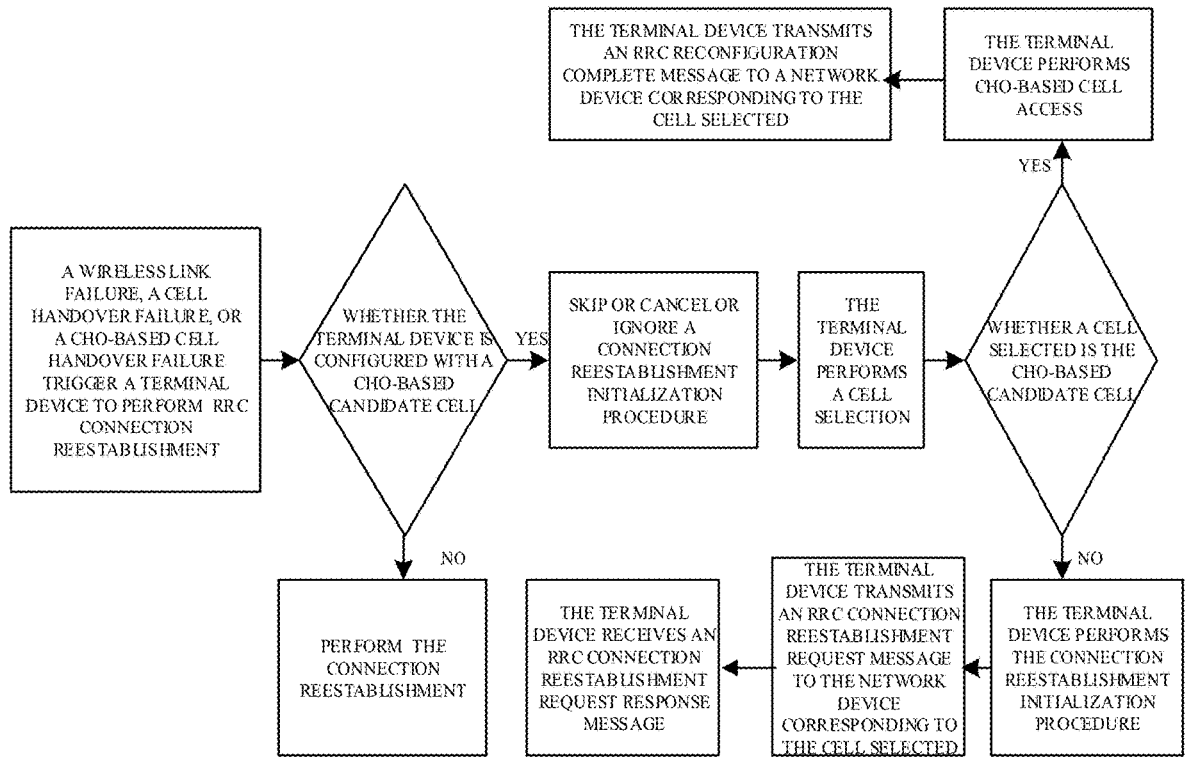
FIG. 5 is a schematic flow chart illustrating a method of connection reestablishment according to implementations.
FIG. 6 is a schematic flow chart illustrating a method of connection reestablishment according to other implementations.

By using part or all of suspending all the RBs except the SRB0, resetting the MAC, releasing the configuration of all the SCells in the MCG, and releasing the spCellConfig as the connection reestablishment initialization procedure, as illustrated in FIG. 5, the following will describe the connection reestablishment procedure performed by the terminal device provided in implementations.

The wireless link failure, the cell handover failure, or the CHO-based cell handover failure trigger the terminal device to perform the RRC connection reestablishment. If the terminal device is not configured with the CHO-based candidate cell, the terminal device performs the existing connection reestablishment procedure (including the connection reestablishment initialization procedure). If the terminal device is configured with the CHO-based candidate cell, the terminal device skips or cancels or ignores the connection reestablishment initialization procedure and performs the cell selection. If the to-be-accessed cell selected by the terminal device is not the CHO-based candidate cell, the terminal device performs the connection reestablishment initialization procedure and transmits the RRC connection reestablishment request message to the network device corresponding to the cell selected and receives an RRC reestablishment request response message from the network device corresponding to the cell selected. If the to-be-accessed cell selected by the terminal device is the CHO-based candidate cell, the terminal device performs the CHO-based cell access, and after the CHO-based cell access is completed, the terminal device transmits the RRC reconfiguration complete message to the network device corresponding to the cell selected.

FIG. 6 is a flow chart illustrating a method of connection reestablishment according to implementations. As illustrated in FIG. 6, the method includes the following.

At block S301, a terminal device resumes an SRB1 when a cell selected by the terminal device for connection reestablishment is a CHO-based candidate cell.

In some implementations, if the terminal device is configured with the CHO-based candidate cell and a to-be-accessed cell selected by the terminal device is the CHO-based candidate cell, the method of connection reestablishment may also include the following.

At block S300, the terminal device performs CHO-based cell access according to a CHO configuration of the candidate cell.

In some implementations, the CHO configuration of the candidate cell may include full configuration of CHO for the candidate cell.

As such, the terminal device can still perform cell access according to the full configuration of the CHO for the candidate cell stored in the terminal device, although the terminal device releases configuration of all SCells in an MCG and spCellConfig.

At block S302, the terminal device transmits, on the SRB1, an RRC reconfiguration complete message to a network device corresponding to the cell selected.

As such, by resuming the SRB1, the terminal device can transmit the RRC reconfiguration complete message to the network device corresponding to the cell selected, and thus achieving connection reestablishment and cell access.

In some implementations, if the terminal device is configured with the CHO-based candidate cell and the to-be-accessed cell selected by the terminal device is not the CHO-based candidate cell, the terminal device transmits an RRC connection reestablishment request message to the network device corresponding to the cell selected without resuming the SRB1.

The implementation is also applicable to a scenario where the source network device does not configure the Scells in the MCG and the spCellConfig for the terminal device. In the implementation, the terminal device does not need to change a connection reestablishment initialization procedure, that is, the terminal device may perform at least one of: suspending all RBs except an SRB0; resetting MAC; releasing the configuration of all the SCells in the MCG, and releasing the spCellConfig.

Based on the method of connection reestablishment in implementations, the related part of the TS 38.331 standard protocol can be described as:

---

5.3.5.3 Reception of an RRCReconfiguration by the UE
<omitted unchanged text>
1>else (MCG RRCReconfiguration):
   2> resume SRB1 that is suspended:
   2> submit the RRCReconfigurationComplete message via SRB1 to lower layers for transmission using the new configuration;
   2> if this is the first RRCReconfiguration message after successful completion of the RRC re-establishment procedure:
      3> resume SRB2 and DRBs that are suspended;

---

Figure 7:
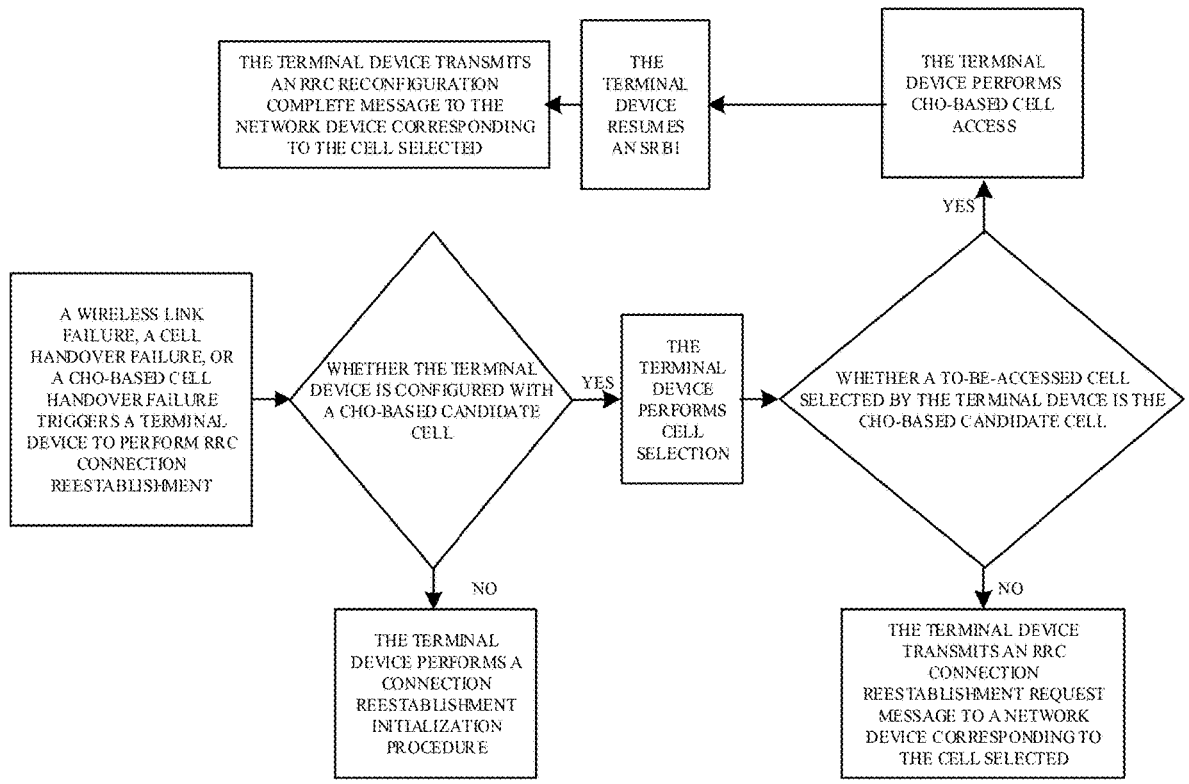
FIG. 7 is a schematic flow chart illustrating a method of connection reestablishment according to other implementations.

FIG. 7 illustrates the connection reestablishment procedure performed by the terminal device according to implementations.

A wireless link failure, a cell handover failure, or a CHO-based cell handover failure triggers the terminal device to perform RRC connection reestablishment. If the terminal device is not configured with the CHO-based candidate cell, the terminal device performs the connection reestablishment initialization procedure. If the terminal device is configured with the CHO-based candidate cell, the terminal device performs the cell selection. If the to-be-accessed cell selected by the terminal device is not the CHO-based candidate cell, the terminal device transmits an RRC connection reestablishment request message to the network device corresponding to the cell selected. If the to-be-accessed cell selected by the terminal device is the CHO-based candidate cell, the terminal device performs the CHO-based cell access, and resumes the SRB1 after the CHO-based cell access is completed. The terminal device transmits, on the SRB1, the RRC reconfiguration complete message to the network device corresponding to the cell selected.

Figure 8:
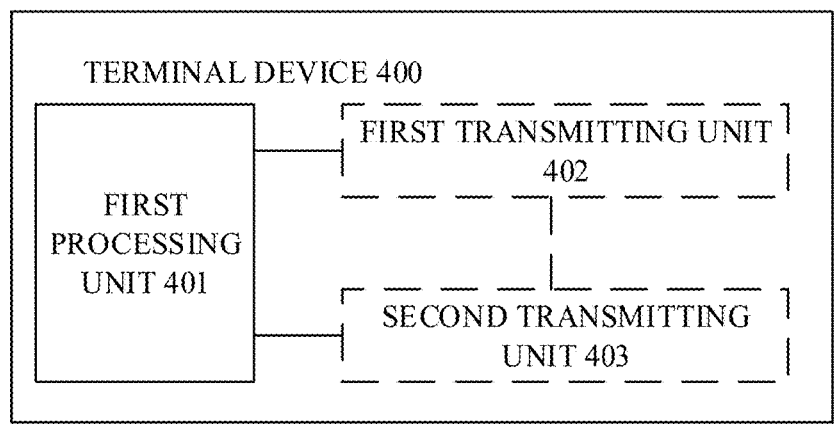
FIG. 8 is a schematic structural diagram illustrating a terminal device according to implementations.

For achieving the method of connection reestablishment according to implementations, a terminal device 400 is also provided according to the implementations. FIG. 8 is a schematic structural diagram illustrating the terminal device 400. The terminal device 400 includes a first processing unit 401.

The first processing unit 401 is configured to prohibit, in a connection reestablishment procedure, execution of at least one of: suspending all RBs except SRB0; resetting MAC; releasing configuration of all SCells in an MCG; or releasing spCellConfig.

In some implementations, the prohibiting includes ignoring, skipping, or cancelling.

In some implementations, the first processing unit 401 is further configured to select a cell to be accessed.

In some implementations, the terminal device 400 is configured with a CHO-based candidate cell.

In some implementations, the first processing unit 401 is further configured to perform, when the cell selected by the terminal device for the connection reestablishment procedure is the CHO-based candidate cell, CHO-based cell access according to CHO configuration of the candidate cell.

In some implementations, the terminal device 400 further includes a first transmitting unit 402 configured to transmit an RRC reconfiguration complete message to a network device corresponding to the cell selected.

In some implementations, the CHO configuration of the candidate cell includes full configuration of CHO for the candidate cell or delta configuration of the CHO for the candidate cell.

In some implementations, the first processing unit 401 is further configured to perform, when the cell selected by the terminal device for the connection reestablishment procedure is not the CHO-based candidate cell, at least one of: suspending all the RBs except the SRB0; resetting the MAC; releasing the configuration of all the SCells in the MCG; or releasing the spCellConfig.

In some implementations, the terminal device 400 further includes a second transmitting unit 403 configured to transmit an RRC connection reestablishment request message to the network device corresponding to the cell selected.

Figure 9:
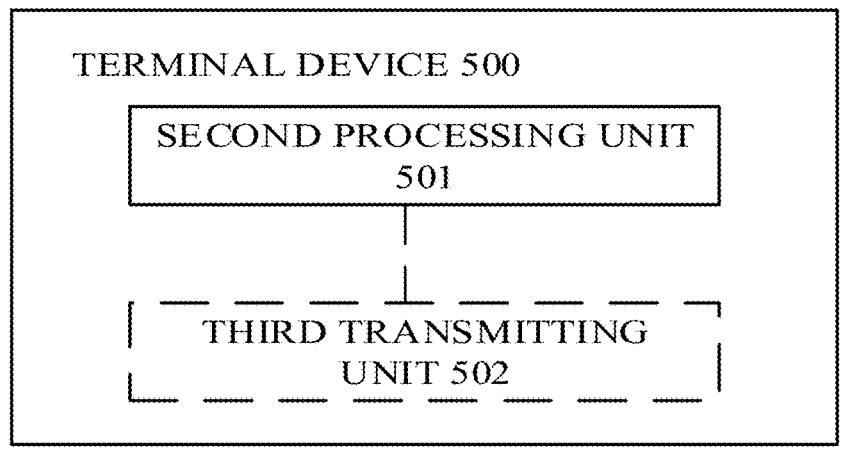
FIG. 9 is a schematic structural diagram illustrating a terminal device according to other implementations.

For achieving the method of connection reestablishment according to implementations, implementations also provide a terminal device 500. FIG. 9 is a schematic structural diagram illustrating the terminal device 500. The terminal device 500 includes a second processing unit 501.

The second processing unit 501 is configured to resume an SRB1 when a cell selected by the terminal device for connection reestablishment procedure is a CHO-based candidate cell.

In some implementations, the terminal device 500 is configured with the CHO-based candidate cell.

In some implementations, the terminal device 500 further includes a third transmitting unit 502 configured to transmit, on the SRB1, an RRC reconfiguration complete message to the network device corresponding to the cell selected.

In some implementations, the second processing unit 501 is further configured to perform CHO-based cell access according to CHO configuration of the candidate cell.

In some implementations, the CHO configuration of the candidate cell includes full configuration of CHO for the candidate cell.

A terminal device is provided according to implementations. The terminal device includes a processor and a memory configured to store computer programs executable by the processor. The processor is configured to run the computer programs to perform the foregoing methods of connection reestablishment performed by the terminal device.

A chip is provided according to implementations. The chip includes a processor. The processor is configured to invoke and execute computer programs stored in a memory, to cause a device equipped with the chip to perform the foregoing methods of connection reestablishment performed by the terminal device.

A storage medium is provided according to implementations. The storage medium is configured to store executable programs which, when executed by a processor, are operable with the processor to perform the foregoing methods of connection reestablishment performed by the terminal device.

A computer program product is provided according to implementations. The computer program product includes computer program instructions which are operable with a computer to perform the foregoing methods of connection reestablishment performed by the terminal device.

A computer program is provided according to implementations. The computer program is operable with a computer to perform the foregoing methods of connection reestablishment performed by the terminal device.

Figure 10:
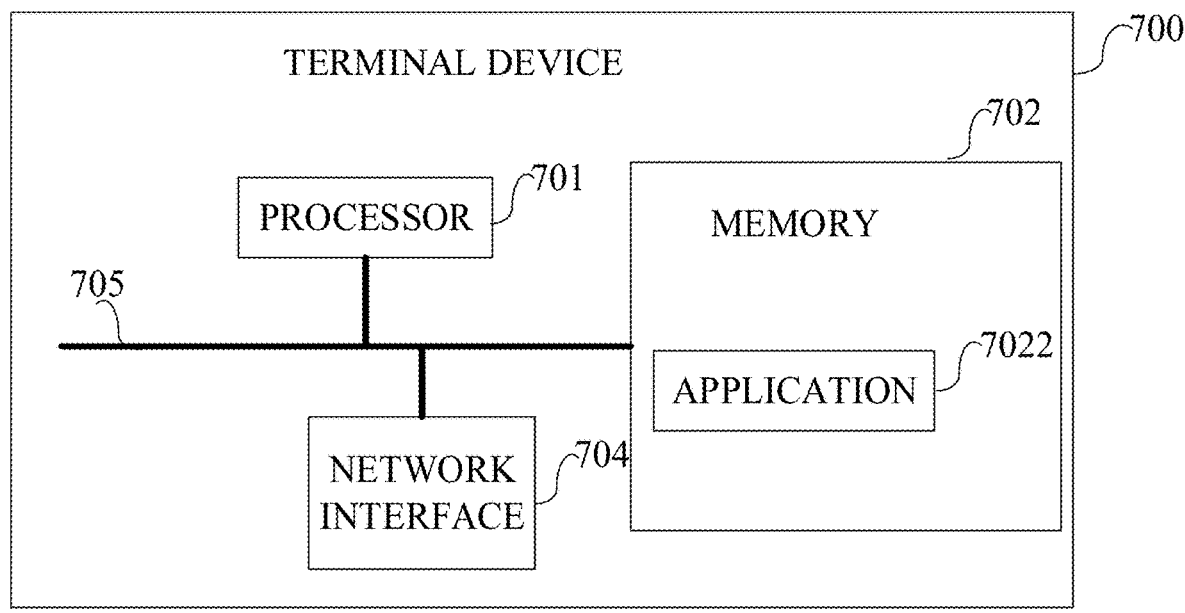
FIG. 10 is a schematic structural diagram illustrating hardware of a terminal device according to implementations.

FIG. 10 is a schematic structural diagram illustrating hardware of a terminal device 700 according to implementations. The terminal device 700 includes: at least one processor 701, a memory 702, and at least one network interface 704. Various components of the terminal device 700 are coupled together via a bus system 705. It can be understood that, the bus system 705 is configured for connection and communication between these components. In addition to a data bus, the bus system 705 further includes a power bus, a control bus, and a status signal bus. However, for the clarity of description, various buses are marked as the bus system 705 in FIG. 10.

It can be understood that, the memory 702 may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc (CD), a compact disc read-only memory (CD-ROM). The magnetic surface memory may be a magnetic disk memory or a magnetic tape memory. The volatile memory can be a random access memory (RAM) that acts as an external cache. By way of example but not limitation, many forms of RAM are available, such as a static random access memory (SRAM), a synchronous static random access memory (SSRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DRRAM). The memory 702 described herein is intended to include, but is not limited to, these and any other suitable types of memory.

The memory 702 of implementations is configured to store various types of data to support operations of the terminal device 700. Examples of these data include: any computer programs for operation on the terminal device 700, such as an application 7022. The application 7022 may include programs implementing the method of implementations.

The methods disclosed in the above implementations can be applied in the processor 701 or implemented by the processor 701. The processor 701 may be an integrated circuit chip with signal processing capabilities. During implementation, each step of the foregoing method may be completed by an integrated logic circuit in the form of hardware or an instruction in the form of software in the processor 701. The processor 701 may be a general-purpose processor, a digital signal processor (DSP), or other programmable logic devices, discrete gates or transistor logic devices, or discrete hardware components. The processor 701 can implement or execute the methods, steps, and logic blocks disclosed in implementations. The general purpose processor may be a microprocessor, or any conventional processors or the like. The steps of the method disclosed in implementations may be implemented through a hardware decoding processor, or may be performed by hardware and software modules in the decoding processor. The software module can be located in a storage medium. The storage medium is located in the memory 702. The processor 701 reads the information in the memory 702, and completes the steps of the method described above with the hardware of the processor.

In exemplary implementations, the terminal device 700 is configured to perform the foregoing methods, implemented by one or more application specific integrated circuits (ASICs), digital signal processing (DSP), programmable logic devices (PLDs), complex programmable logic devices (CPLDs), field-programmable gate arrays (FPGAs), general purpose processors, controllers, micro controller units (MCUs), microprocessor units (MPUs), or other electronic components.

Implementations further provide a storage medium. The storage medium is configured to store computer programs.

The storage medium is applicable to the terminal device of implementations. The computer programs are operable with a computer to implement the operations in the foregoing methods performed by the terminal device, which will not be repeated herein for the sake of simplicity.

Alternatively, the storage medium is applicable to the source network device of implementations. The computer programs are operable with a computer to implement the operations in the foregoing methods performed by the source network device, which will not be repeated herein for the sake of simplicity.

The disclosure is described herein with reference to schematic flow charts and/or block diagrams of methods, apparatuses (systems), and computer program products according to the implementations of the disclosure. It should be understood that each flow and/or block in the flow chart and/or block diagram, and a combination of flow and/or block in the flow chart and/or block diagram can be implemented by computer program instructions. These computer program instructions may be provided to a general purpose computer, a special purpose computer, an embedded processor or a processor of other programmable data processing apparatuses to form a machine, such that devices for implementing functions specified by one or more flows in the flow chart and/or one or more blocks in the block diagram may be generated by executing the instructions with the processor of the computer or other programmable data processing apparatuses.

The computer program instructions may also be stored in a computer-readable memory that can direct the computer or other programmable data processing apparatuses to operate in a given manner, so that the instructions stored in the computer-readable memory produce a manufactured article including an instruction device, and the instruction device implements the functions specified by one or more flows in the flow chart and/or one or more blocks in the block diagram.

The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flow chart and/or one or more blocks in the block diagram.

It should be understood that, the terms "system" and "network" in this disclosure are often used interchangeably. The term "and/or" in this disclosure is simply a description of the association relationship of associated objects, indicating that three relationships can exist, for example, A and/or B, which can indicate the existence of A alone, A and B together, and B alone. In addition, the character "/" in this disclosure generally indicates that associated objects are in an "or" relationship.

The above is only an implementation of the disclosure and is not intended to limit the scope of protection of the disclosure. Any modification, equivalent arrangements and improvement made within the spirit and principles of the disclosure shall be included in the scope of protection of the disclosure.

What is claimed is:

1. A method of connection reestablishment, comprising:
   determining, by a terminal device, whether to perform a connection reestablishment initialization procedure according to whether the terminal device is configured with a conditional handover (CHO)-based candidate cell, comprising:
   prohibiting, by the terminal device, execution of the connection reestablishment initialization procedure, in response to the terminal device being configured with the CHO-based candidate cell;
   prohibiting, by the terminal device, execution of the connection reestablishment initialization procedure, comprises:
   prohibiting, by the terminal device, execution of:
   suspending all radio bearers (RBs) except a signalling radio bearer 0 (SRB0);
   releasing configuration of secondary cells (SCells) in a master cell group (MCG); and
   releasing secondary primary cell configuration (spCellConfig).

2. The method of claim 1, wherein determining, by the terminal device, whether to perform the connection reestablishment procedure according to whether the terminal device is configured with the CHO-based candidate cell, comprises:
   performing, by the terminal device, the connection reestablishment procedure, in response to the terminal device being not configured with the CHO-based candidate cell.

3. The method of claim 1, further comprising:
   determining, by the terminal device, whether to perform the connection reestablishment initialization procedure according to whether a to-be-accessed cell selected by the terminal device is the CHO-based candidate cell.

4. The method of claim 3, wherein determining, by the terminal device, whether to perform the connection reestablishment initialization procedure according to whether the to-be-accessed cell selected by the terminal device is the CHO-based candidate cell, comprises:
   performing, by the terminal device, CHO-based cell access according to CHO configuration of the candidate cell, in response to the to-be-accessed cell selected by the terminal device being the CHO-based candidate cell.

5. The method of claim 4, further comprising:
   transmitting, by the terminal device, a radio resource control (RRC) reconfiguration complete message to a network device corresponding to the to-be-accessed cell selected by the terminal device.

6. The method of claim 3, wherein determining, by the terminal device, whether to perform the connection reestablishment initialization procedure according to whether the to-be-accessed cell selected by the terminal device is the CHO-based candidate cell, comprises:
   performing, by the terminal device, the connection reestablishment initialization procedure, in response to the to-be-accessed cell selected by the terminal device being not the CHO-based candidate cell.

7. The method of claim 6, wherein performing, by the terminal device, the connection reestablishment initialization procedure, comprises:
   performing, by the terminal device, at least one of:
   suspending, by terminal device, all the RBs except the SRB0;
   resetting, by terminal device, the MAC;
   releasing, by terminal device, the configuration of all the SCells in the MCG; or
   releasing, by terminal device, the spCellConfig.

8. A terminal device, comprising:
   at least one processor; and
   a memory storing a computer program which, when executed by the at least one processor, causes the at least one processor to:
   determine whether to perform a connection reestablishment initialization procedure according to whether the terminal device is configured with a conditional handover (CHO)-based candidate cell;
   wherein the computer program causing the at least one processor to determine whether to perform the connection reestablishment initialization procedure according to whether the terminal device is configured with the CHO-based candidate cell causes the at least one processor to:
   prohibit execution of the connection reestablishment initialization procedure, in response to the terminal device being configured with the CHO-based candidate cell;
   wherein the computer program causing the at least one processor to prohibit execution of the connection reestablishment initialization procedure causes the at least one processor to:
   prohibit execution of:

suspending all radio bearers (RBs) except a signalling radio bearer 0 (SRB0);
releasing configuration of secondary cells (SCells) in a master cell group (MCG); and
releasing secondary primary cell configuration (spCellConfig).

9. The terminal device of claim 8, wherein the computer program causing the at least one processor to determine whether to perform the connection reestablishment procedure according to whether the terminal device is configured with the CHO-based candidate cell causes the at least one processor to:
perform the connection reestablishment procedure, in response to the terminal device being not configured with the CHO-based candidate cell.

10. The terminal device of claim 8, wherein the computer program, when executed by the at least one processor, further causes the at least one processor to:
determine whether to perform the connection reestablishment initialization procedure according to whether a to-be-accessed cell selected by the terminal device is the CHO-based candidate cell.

11. The terminal device of claim 10, wherein the computer program causing the at least one processor to determine whether to perform the connection reestablishment initialization procedure according to whether the to-be-accessed cell selected by the terminal device is the CHO-based candidate cell causes the at least one processor to:
perform CHO-based cell access according to CHO configuration of the candidate cell, in response to the to-be-accessed cell selected by the terminal device being the CHO-based candidate cell.

12. The terminal device of claim 11, wherein the computer program, when executed by the at least one processor, further causes the at least one processor to:
transmit a radio resource control (RRC) reconfiguration complete message to a network device corresponding to the to-be-accessed cell selected by the terminal device.

13. The terminal device of claim 11, wherein the computer program causing the at least one processor to determine whether to perform the connection reestablishment initialization procedure according to whether the to-be-accessed cell selected by the terminal device is the CHO-based candidate cell causes the at least one processor to:
perform the connection reestablishment initialization procedure, in response to the to-be-accessed cell selected by the terminal device being not the CHO-based candidate cell.

14. The terminal device of claim 13, wherein the computer program causing the at least one processor to perform the connection reestablishment initialization procedure causes the at least one processor to perform at least one of:
suspending all the RBs except the SRB0;
resetting the MAC;
releasing the configuration of all the SCells in the MCG; or
releasing the spCellConfig.

15. A non-transitory computer-readable storage medium, being configured to store a computer program;
the computer program, when executed by at least one processor of a terminal device, causing the at least one processor to:
determine whether to perform a connection reestablishment initialization procedure according to whether the terminal device is configured with a conditional handover (CHO)-based candidate cell;
wherein the computer program causing the at least one processor to determine whether to perform the connection reestablishment initialization procedure according to whether the terminal device is configured with the CHO-based candidate cell causes the at least one processor to:
prohibit execution of the connection reestablishment initialization procedure, in response to the terminal device being configured with the CHO-based candidate cell;
wherein the computer program causing the at least one processor to prohibit execution of the connection reestablishment initialization procedure causes the at least one processor to:
prohibit execution of:
suspending all radio bearers (RBs) except a signalling radio bearer 0 (SRB0);
releasing configuration of secondary cells (SCells) in a master cell group (MCG); and
releasing secondary primary cell configuration (spCellConfig).

16. The non-transitory computer-readable storage medium of claim 15, wherein the computer program causing the at least one processor to determine whether to perform the connection reestablishment procedure according to whether the terminal device is configured with the CHO-based candidate cell causes the at least one processor to:
perform the connection reestablishment procedure, in response to the terminal device being not configured with the CHO-based candidate cell.

17. The method of claim 1, further comprising:
performing, by the terminal device, cell selection; and
performing, by the terminal device, CHO-based cell access according to CHO configuration of the CHO-based candidate cell that comprises delta configuration of CHO for the CHO-based candidate cell and according to configuration of the SCells in the MCG and the spCellConfig, in response to a to-be-accessed cell selected by the terminal device being the CHO-based candidate cell.

18. The terminal device of claim 8, wherein the computer program, when executed by the at least one processor, further causes the at least one processor to:
perform cell selection; and
perform CHO-based cell access according to CHO configuration of the CHO-based candidate cell that comprises delta configuration of CHO for the CHO-based candidate cell and according to configuration of the SCells in the MCG and the spCellConfig, in response to a to-be-accessed cell selected by the terminal device being the CHO-based candidate cell.

19. The non-transitory computer-readable storage medium of claim 15, wherein the computer program, when executed by the least one processor, further causes the at least one processor to:
perform cell selection; and
perform CHO-based cell access according to CHO configuration of the CHO-based candidate cell that comprises delta configuration of CHO for the CHO-based candidate cell and according to configuration of the SCells in the MCG and the spCellConfig, in response to a to-be-accessed cell selected by the terminal device being the CHO-based candidate cell.

* * * * *